(12) United States Patent
Urano

(10) Patent No.: US 10,887,511 B2
(45) Date of Patent: Jan. 5, 2021

(54) IMAGE PROCESSING APPARATUS, INFORMATION DISPLAY APPARATUS, CONTROL METHOD, AND COMPUTER-READABLE STORAGE MEDIUM THAT OUTPUT A COMBINED IMAGE BASED ON BRIGHTNESS VALUES OF PIXELS IN AN IMAGE

(71) Applicant: CANON KABUSHIKI KAISHA, Tokyo (JP)

(72) Inventor: Moemi Urano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/386,666

(22) Filed: Apr. 17, 2019

(65) Prior Publication Data

US 2019/0327410 A1    Oct. 24, 2019

(30) Foreign Application Priority Data

Apr. 20, 2018   (JP) .................................. 2018-081737

(51) Int. Cl.
*H04N 5/232* (2006.01)
*H04N 5/235* (2006.01)
(Continued)

(52) U.S. Cl.
CPC ....... *H04N 5/23229* (2013.01); *G06F 9/3004* (2013.01); *G06K 9/3241* (2013.01); *H04N 5/2354* (2013.01)

(58) Field of Classification Search
CPC ............ H04N 5/23229; H04N 5/2354; H04N 5/232933; H04N 5/2355; H04N 5/2356;
(Continued)

(56) References Cited

U.S. PATENT DOCUMENTS 7,508,421 B2   3/2009 Tamaru et al.
7,750,950 B2   7/2010 Tamaru et al.
(Continued)

FOREIGN PATENT DOCUMENTS

CN   101071502 A   11/2007
CN   101290754 A   10/2008
(Continued)

OTHER PUBLICATIONS

Extended European Search Report dated Sep. 5, 2019, issued in corresponding European Patent Application No. 19168311.9.
(Continued)

*Primary Examiner* — Padma Haliyur
(74) *Attorney, Agent, or Firm* — Venable LLP

(57) ABSTRACT

An image processing apparatus classifies areas included in an image in which one scene is captured, based on the distribution of brightness values of the image, accepts selection of an area that is to be processed, from among the classified areas, extends a first output range corresponding to an input range of brightness values of pixels in the selected area, so as to be wider than a second output range that is the output range when the area is not selected, and outputs an image for which an output range of brightness values has been extended to the first output range and that includes at least the selected area.

10 Claims, 13 Drawing Sheets

(51) Int. Cl.
*G06F 9/30* (2018.01)
*G06K 9/32* (2006.01)

(58) Field of Classification Search
CPC .. H04N 5/23216; H04N 5/23206; H04N 7/18; G06F 9/3004; G06K 9/3241; G06T 2207/10144; G06T 5/008; G06T 5/50; G06T 5/007; G06T 5/40
See application file for complete search history.

(56) References Cited

U.S. PATENT DOCUMENTS

| | | | |
|---|---|---|---|
| 8,264,594 B2 * | 9/2012 | Yeo | G06T 5/009 |
| | | | 348/362 |
| 9,167,174 B1 | 10/2015 | Rivard | |
| 9,571,742 B2 * | 2/2017 | Watanabe | H04N 5/2353 |
| 10,554,901 B2 * | 2/2020 | Kiser | G06K 9/00805 |
| 2007/0070223 A1 | 3/2007 | Tamaru et al. | |
| 2007/0076103 A1 | 4/2007 | Tamaru et al. | |
| 2015/0116489 A1 | 4/2015 | Asano | |
| 2016/0112644 A1 | 4/2016 | Nishi | |

FOREIGN PATENT DOCUMENTS

| | | |
|---|---|---|
| EP | 0725536 A2 | 8/1996 |
| EP | 3007434 A1 | 4/2016 |
| JP | 2004-056568 A | 2/2004 |

OTHER PUBLICATIONS

Chinese Office Action dated Jul. 30, 2020, issued in corresponding Chinese Patent Application No. 201910302867.5.

* cited by examiner

IMAGE PROCESSING APPARATUS, INFORMATION DISPLAY APPARATUS, CONTROL METHOD, AND COMPUTER-READABLE STORAGE MEDIUM THAT OUTPUT A COMBINED IMAGE BASED ON BRIGHTNESS VALUES OF PIXELS IN AN IMAGE

This application claims the benefit of Japanese Patent Application No. 2018-081737, filed Apr. 20, 2018 which is hereby incorporated by reference herein in its entirety.

BACKGROUND OF THE INVENTION

Field of the Invention

The present invention relates to technology for image adjustment.

Description of the Related Art

In recent years, monitoring systems that utilize network cameras have been widespread. Network cameras are used for various purposes, for example, as monitoring cameras in large-scale public facilities or mass retailers, and it is envisaged that shooting is performed in environments where a difference in illuminance is great or lighting is different, such as in indoor and outdoor environments. Japanese Patent Laid-Open No. 2004-056568 discloses technology for performing gamma correction and gain correction for a scene that has been shot.

However, with the technology disclosed in Japanese Patent Laid-Open No. 2004-056568, if one image includes an area where brightness is significantly different from that of another area, there may be cases where appropriate luminosity and color reproduction cannot be realized at the same time, which may result in lower visibility.

SUMMARY OF THE INVENTION

The present invention provides technology for, when one image includes an area where brightness is significantly different from that of another area, improving the visibility of a subject in the area.

According to one aspect, the present invention provides an image processing apparatus comprising a classification unit configured to classify areas included in an image in which one scene is captured, based on the distribution of brightness values of the image, an accepting unit configured to accept selection of an area that is to be processed, from among the classified areas, an extension unit configured to extend a first output range corresponding to an input range of brightness values of pixels in the selected area, so as to be wider than a second output range that is the output range when the area is not selected, and an output unit configured to output an image for which an output range of brightness values has been extended to the first output range and that includes at least the selected area.

According to another aspect, the present invention provides an information display apparatus comprising an obtaining unit configured to obtain, from another apparatus, information for classifying areas included in an image in which one scene is captured, based on the distribution of brightness values of the image, a display unit configured to display classified areas such that the classified areas can be distinguished from each other, an accepting unit configured to accept selection of an area that is to be processed, from among the classified areas, a transmitting unit configured to transmit accepted information to the other apparatus, and a receiving unit configured to receive an image that includes at least the selected area, where a first output range corresponding to an input range of brightness values of pixels in the selected area has been extended by the other apparatus so as to be wider than a second output range that is the output range when the area is not selected, wherein the display unit displays the received image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

System Configuration

Figure 1:
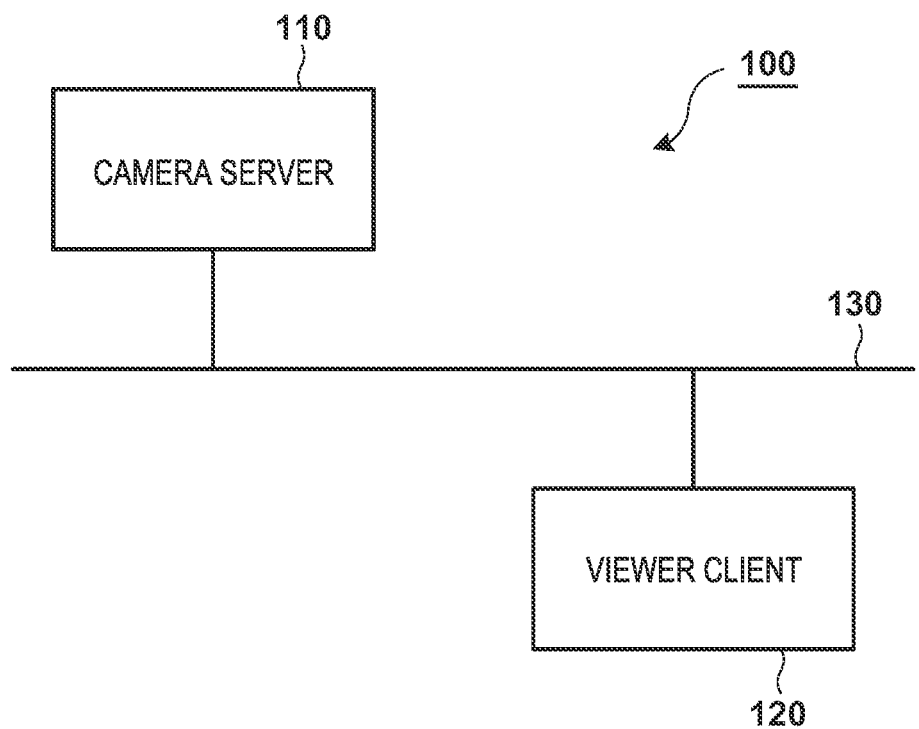
FIG. 1 shows an example of a system configuration.

FIG. 1 shows an example of a configuration of a network camera system 100 according to the present embodiment. This system includes a camera server 110 and a viewer client 120. Note that the camera server 110 and the viewer client 120 are connected to each other via a network 130. The camera server 110 distributes image data regarding images that have been shot (captured) by a network camera, via the network 130. The viewer client 120 accesses the camera server 110 via the network 130. The viewer client 120 changes camera settings, processes image data obtained as a result of image capturing performed by the camera, or processes accumulated image data, or the like, and displays an image based on the processed image data. The network 130 connects the camera server 110 and the viewer client 120 such that they can communicate with each other. The network 130 includes, for example, one or more routers, switches, cables, and so on, that operate according to communication standards such as Ethernet (registered trademark). Note that the network 130 may be any network, for which communication standards, the scale, and the configuration are not limited, as long as it can realize communication between the camera server 110 and the viewer client 120. That is to say, the network 130 may be the Internet or an intranet, a WAN or a LAN, or a wired network or a wireless network, for example. Note that the camera server 110 may support an image capturing apparatus other than a network camera. For example, the camera server 110 may distribute image data regarding images that have been captured by any apparatus that has an image capturing function, such as a digital single-lens reflex camera, a mirrorless single-lens camera, a compact digital camera, a camcorder, a tablet terminal, a PHS, a smartphone, a feature phone, or a portable game machine.

Apparatus Configurations

Figure 2:
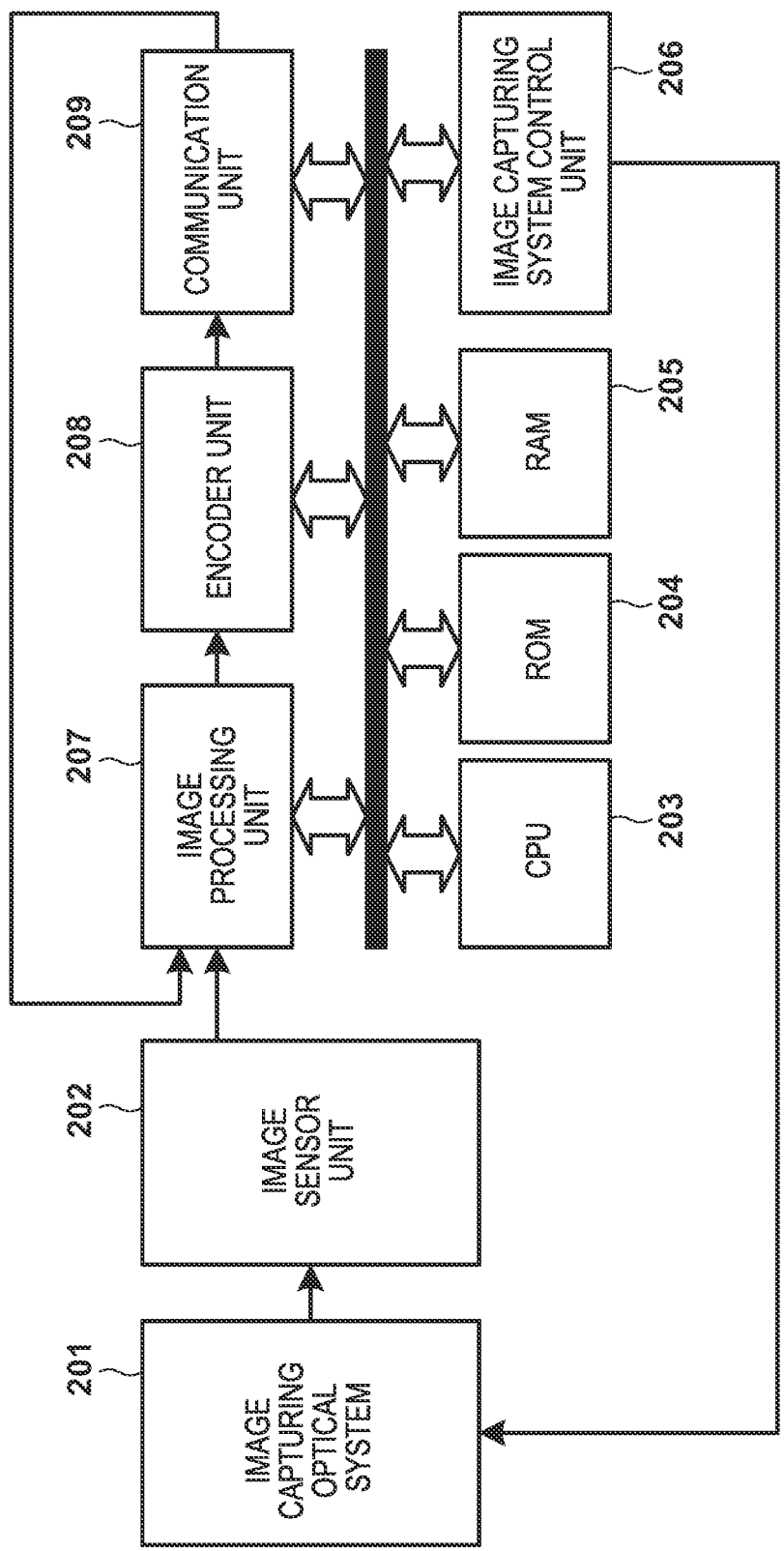
FIG. 2 is a block diagram showing an example of a configuration of a camera server.

Next, the following describes examples of configurations of the camera server 110 and the viewer client 120. FIG. 2 is a block diagram showing an example of a configuration of the camera server 110. In one example, the camera server 110 includes an image capturing optical system 201, an image sensor unit 202, a CPU 203, a ROM 204, a RAM 205, an image capturing system control unit 206, an image processing unit 207, an encoder unit 208, and a communication unit 209. Note that "CPU" is an abbreviation of Central Processing Unit, "ROM" is an abbreviation of Read Only Memory, and "RAM" is an abbreviation of Random Access Memory.

The image capturing optical system 201 includes an objective lens, a zoom lens, a focus lens, and an optical diaphragm, and condenses light from a subject onto the image sensor unit 202 to obtain optical information. The image sensor unit 202 includes a CCD or CMOS sensor, which are sensors that convert optical information obtained by the image capturing optical system 201 condensing light to a current value (an electrical signal), and the image sensor unit 202 is configured to obtain color information, using a color filter, or the like. The image sensor unit 202 may be an image sensor that can set any exposure period for any pixel.

The CPU 203 is involved in all processing performed by the components of the camera server 110. The CPU 203 sequentially reads and interprets instructions stored in the ROM 204 or the RAM 205, and executes processing according to the results of the interpretation. Note that the CPU 203 is an example of a processor, and another processor, such as an MPU (Micro Processing Unit) or an ASIC (Application Specific Integrated Circuit) may be used instead of, or in addition to, the CPU 203. Also, a gate array circuit such as an FPGA (Field Programmable Gate Array) that has been programmed to execute specific processing may be used instead of, or in addition to, the CPU 203. Also, other memories or storage devices may be used instead of, or in addition to, the ROM 204 and the RAM 205. That is to say, the camera server 110 may include one or more processors of any kind and one or more memories/storage devices of any kind.

The image capturing system control unit 206 controls the image capturing optical system 201 to drive a focus lens for focusing, to adjust the aperture, and so on. The image capturing system control unit 206 controls the image sensor unit 202 to obtain a plurality of images of different exposure periods. Note that such control is executed according to an instruction from the CPU 203, for example. Driving control of the diaphragm is executed based on an exposure value calculated based on an AE function designated according to a shooting mode set by a user, such as program automatic exposure (AE), shutter priority AE, or aperture priority AE. The image capturing system control unit 206 also performs autofocus (AF) control (while performing AE control, if necessary). An active method, a phase difference detection method, a contrast detection method, or the like, is applied to AF control. Such a configuration and control of AE and AF are well-known, and, therefore, detailed descriptions thereof are omitted here.

The image processing unit 207 obtains an electrical signal generated by the image sensor unit 202, performs image processing, which will be described later, on the electrical signal, and thus generates a brightness signal Y and color difference signals Cb and Cr. The encoder unit 208 performs processing to convert image data processed by the image processing unit 207 to data in a predetermined format such as Jpeg or H.264. The communication unit 209 performs processing for communication between the camera server 110 and the network 130. The camera server 110 outputs image data processed by the image processing unit 207 and the encoder unit 208, via the communication unit 209. Such image data is distributed to the viewer client 120 via the network 130. The camera server 110 also receives a camera operation command and information regarding the result of selection of gamma characteristics of a designated area, from the viewer client 120 and transmits responses to them and necessary data other than image data, via the communication unit 209 and the network 130.

Figure 3:
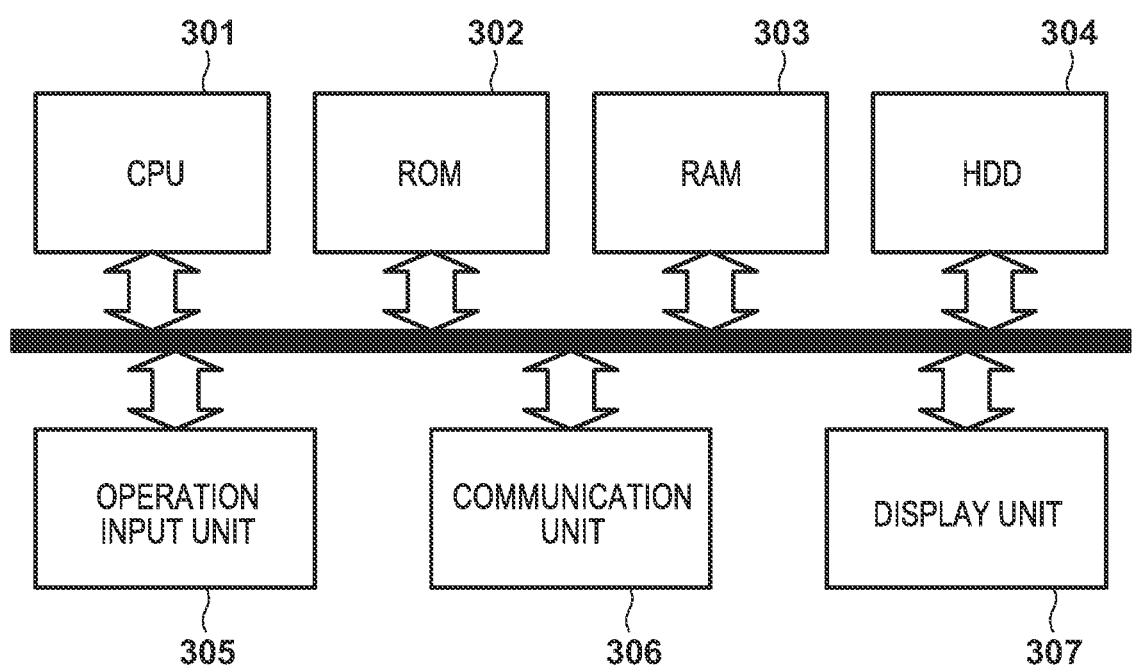
FIG. 3 is a block diagram showing an example of a configuration of a viewer client.

FIG. 3 is a block diagram showing an example of a configuration of the viewer client 120. In one example, the viewer client 120 includes a CPU 301, a ROM 302, a RAM 303, an HDD 304, an operation input unit 305, a communication unit 306, and a display unit 307. Note that "HDD" means a hard disk drive.

The CPU 301 controls overall operations of the viewer client 120. Note that the CPU 301 is an example of a processor, and another processor such as an MPU or an ASIC may be used instead of, or in addition to, the CPU 301. Also, a gate array circuit such as an FPGA (Field Programmable Gate Array) that has been programmed to execute specific processing may be used instead of, or in addition to, the CPU 301. The ROM 302 is a nonvolatile memory that stores a control program, and so on, that are necessary for the CPU 301 to execute processing. The RAM 303 is a memory that serves as a main memory, a work area, and so on, for the CPU 301. That is to say, when executing processing, the CPU 301 loads a necessary program, or the like, from the ROM 302 to the RAM 303, and executes the program, or the like, to execute various kinds of processing, for example. The HDD 304 stores, for example, various kinds of data, various kinds of information, and so on, that are necessary for the CPU 301 to perform processing using a program. The HDD 304 also stores, for example, various kinds of data, various kinds of information, and so on, that have been obtained as a result of the CPU 301 performing processing using a program, and so on.

The operation input unit 305 is an input accepting unit that accepts user operations that are input via operation devices such as a power button, a keyboard, and a mouse. The communication unit 306 performs processing for communication between the viewer client 120 and the network 130. For example, the viewer client 120 receives image data regarding an image that has been shot, using the communication unit 306, via the network 130. The viewer client 120 also transmits a camera operation command to the camera server 110, and receives a response to it and necessary data other than image data, using the communication unit 306, via the network 130. The display unit 307 includes a visual output device for presenting information to a user, such as a display or an LED (Light Emitting Diode). Also, the display unit 307 may include one or more of devices such as an audio output device that presents information using audio and a vibration device that presents information using vibrations. For example, the display unit 307 displays a GUI for inputting various control parameters of the camera server 110, and so on.

Note that one or more or all of the functions of the elements of the viewer client 120 can be realized by the CPU 301 executing a program. However, at least one of the elements of the viewer client 120 may be realized using a piece of dedicated hardware. In such a case, the piece of dedicated hardware may be configured to operate under the control of the CPU 301.

The following describes some examples of the above-described functional configuration of the image processing unit 207 of the camera server 110, and examples of processing flows.

Configuration of Image Processing Unit

Figure 4:
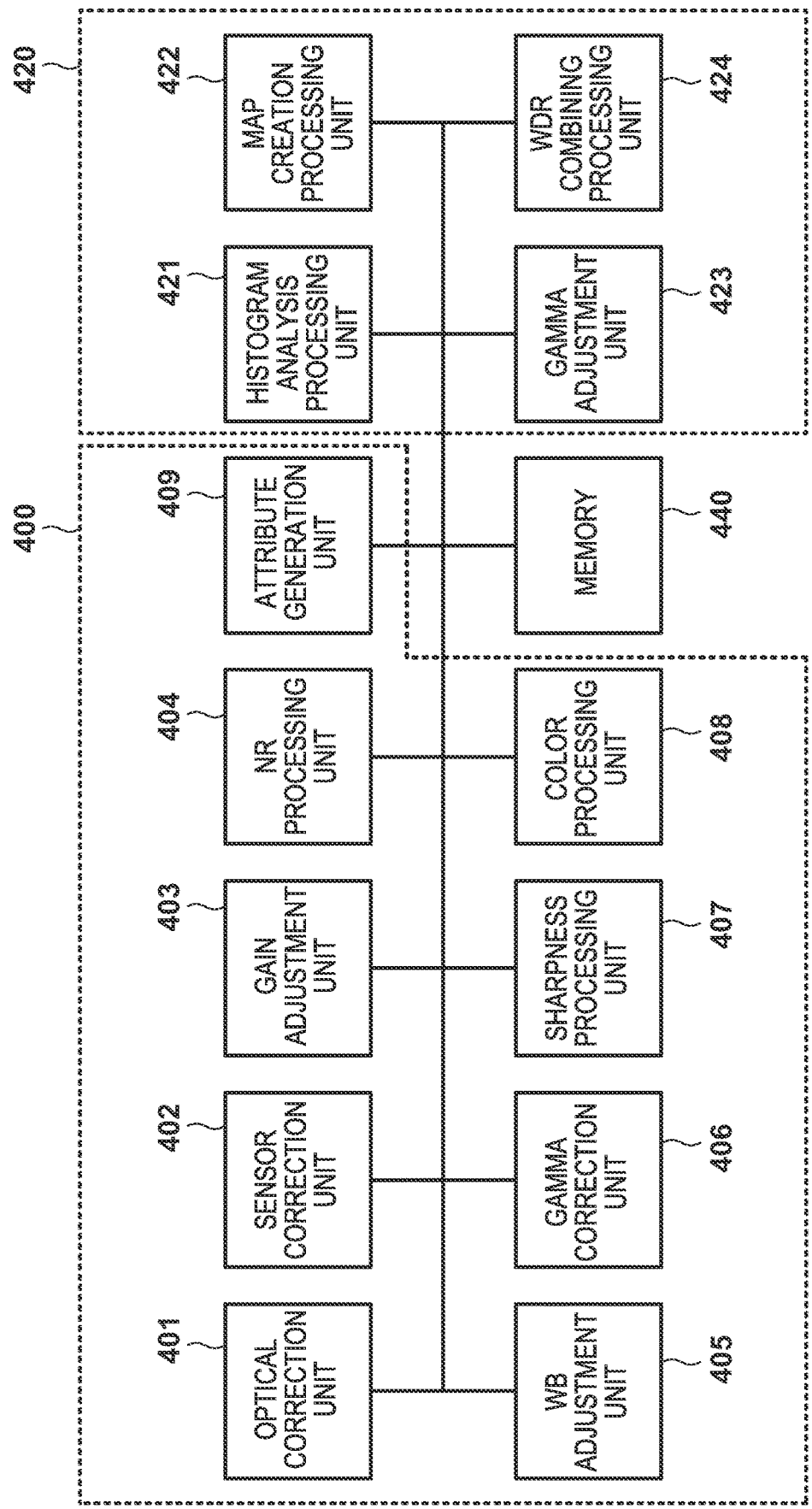
FIG. 4 is a block diagram showing an example of a functional configuration of an image processing unit of the camera server.

FIG. 4 shows a first example of the functional configuration of the image processing unit 207. The image processing unit 207 includes a development processing unit 400 and a dynamic range extension processing unit 420 as functional units thereof. The development processing unit 400 includes, for example, an optical correction unit 401, a sensor correction unit 402, a gain adjustment unit 403, an NR processing unit 404, a WB adjustment unit 405, a gamma correction unit 406, a sharpness processing unit 407, a color processing unit 408, and an attribute generation unit 409. The dynamic range extension processing unit 420 includes, for example, a histogram analysis processing unit 421, a map creation processing unit 422, a gamma adjustment unit 423, and a WDR combining processing unit 424.

The development processing unit 400 performs processing corresponding to the functional units included therein, on image data input from the image sensor unit 202. That is to say, the optical correction unit 401 performs correction on an optical system such as on a lens, the sensor correction unit 402 performs correction on a sensor, the gain adjustment unit 403 performs gain adjustment, and the NR processing unit 404 performs noise reduction (NR) processing. The WB adjustment unit 405 performs white balance (WB) adjustment, the gamma correction unit 406 performs gamma correction, the sharpness processing unit 407 performs sharpness processing, and the color processing unit 408 performs color processing. Outputs from the development processing unit 400 are stored in a memory 440. The attribute generation unit 409 transmits, to each image processing unit, attribute information for changing image processing, according to the brightness of pixels. Each processing unit is configured to be able to change processing parameters in response to processing information thus transmitted. For example, a brightness threshold value Yth is set to an attribute setting unit (not shown). The attribute setting unit compares, for each of the pixels to be processed, the brightness thereof and the threshold value Yth, and adds information regarding whether or not the brightness is greater than the threshold value, to brightness information regarding the pixel, as attribute information. The units from the optical correction unit 401 to the color processing unit 408 can change the processing parameters held by the respective modules with reference to this attribute information.

The histogram analysis processing unit 421 performs histogram analysis regarding brightness on a developed image, to obtain brightness distribution. The map creation processing unit 422 generates map information, which specifies an area that has brightness values that are distinct from those of the entire developed image, for example, based on the result of analysis performed by the histogram analysis processing unit 421. The gamma adjustment unit 423 adjusts a gamma value for gamma correction, for at least an area in an image, according to an instruction from the viewer client 120. The WDR combining processing unit 424 executes combining processing to combine a plurality of images that have been obtained at exposures that are different from each other, thereby generating an image with an extended dynamic range.

Processing Flow

Next, the following describes an example of a flow of processing that is executed by the camera server 110 (the image processing unit 207) and the viewer client 120.

First Example of Processing

Figure 5:
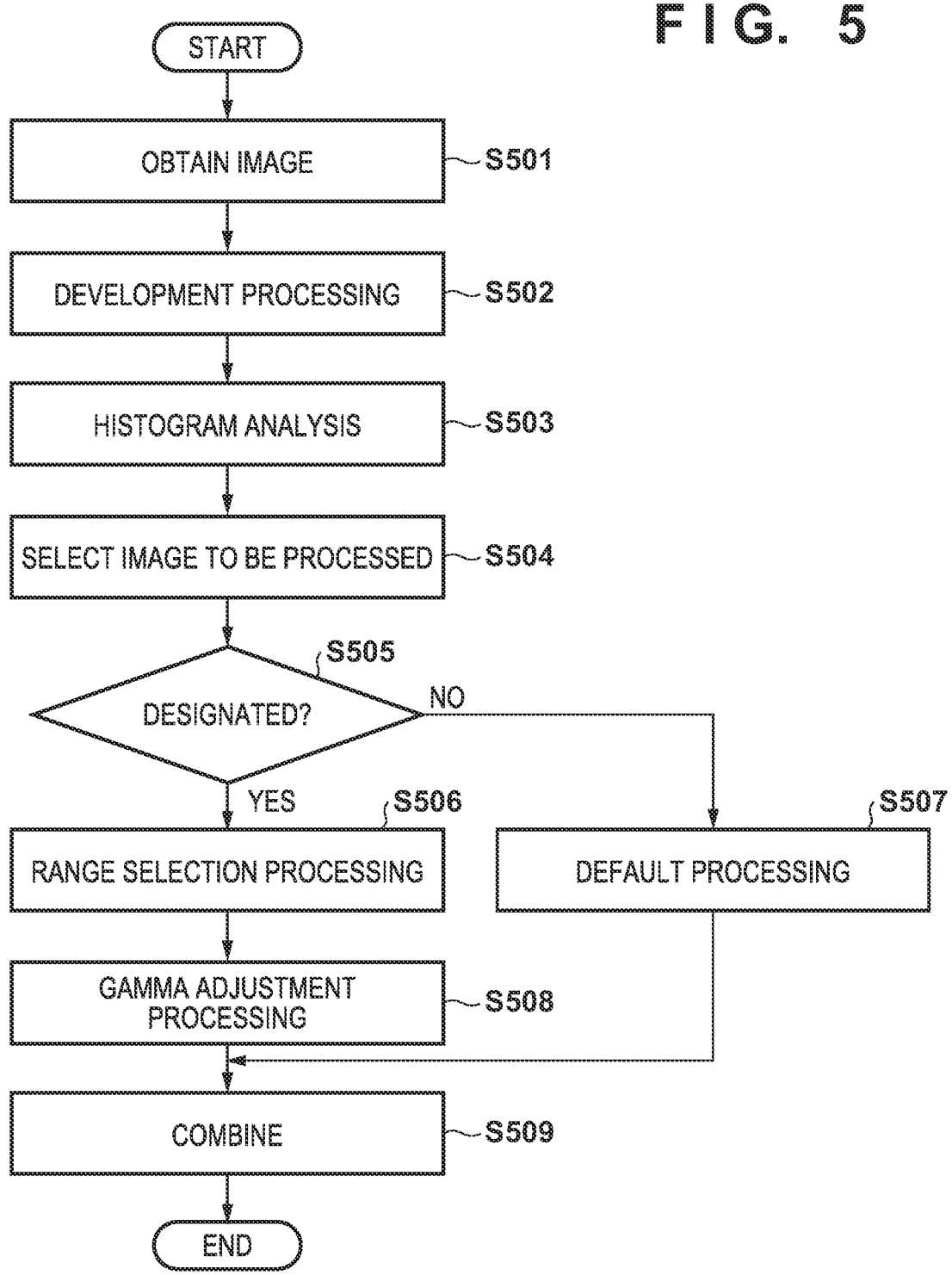
FIG. 5 is a flowchart showing a first example of a flow of processing that is performed by the camera server.
Figure 6:
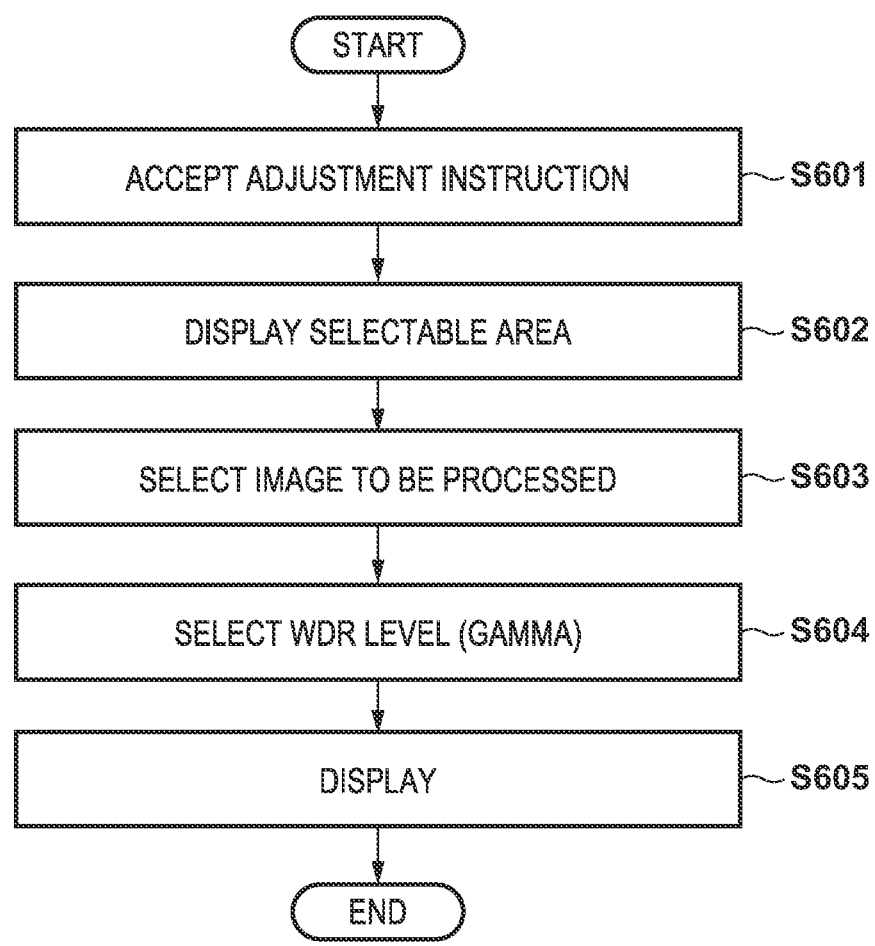
FIG. 6 is a flowchart showing a first example of a flow of processing that is performed by the viewer client.

FIG. 5 shows an example of a flow of processing that is executed by the camera server 110, and FIG. 6 shows an example of a flow of processing that is executed by the viewer client 120.

First, the viewer client 120 accepts an adjustment instruction, in response to a user operation, for example (step S601). Note that an adjustment instruction may be automatically accepted, for example, based on settings for a predetermined application, without a user operation being made. For example, an application for a monitoring camera may be set such that an adjustment instruction is automatically provided during a time period in which an area where a difference in illuminance is larger than in the other area is likely to occur in a captured area. Upon accepting an adjustment instruction, the viewer client 120 notifies the camera server 110 that an adjustment instruction has been provided. The image processing unit 207 of the camera server 110 executes the processing shown in FIG. 5 in response to this notification. Note that the camera server 110 may be configured to distribute images without receiving an instruction from the viewer client 120. If such an instruction is not provided, the camera server 110 may only execute the processing in steps S501, S502, S507, and S508, which will be described later.

The image processing unit 207 obtains image data output from the image sensor unit 202 (step S501), and performs various kinds of processing on the image data in the above-described development processing unit 400 (step S502). In step S501, the image processing unit 207 obtains a plurality of images of different exposure periods. Thereafter, the image processing unit 207 performs histogram analysis on the obtained image data (each of the plurality of images of different exposure periods) (step S503). The following describes histogram analysis with reference to FIGS. 7 and 8.

Figure 7:
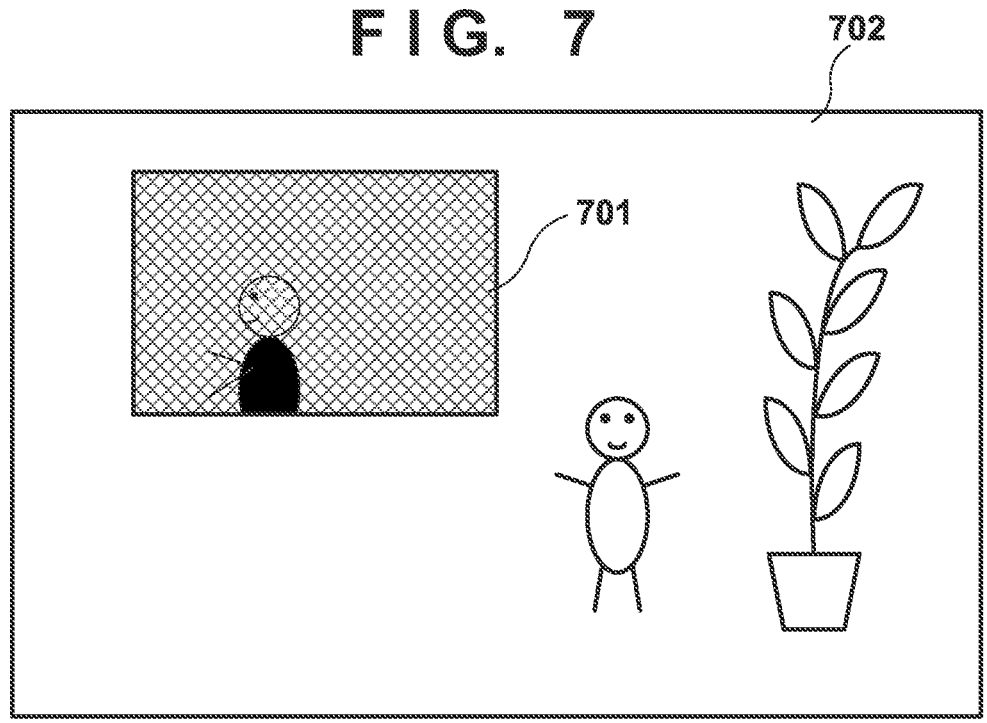
FIG. 7 shows an example of a captured scene.
Figure 8:
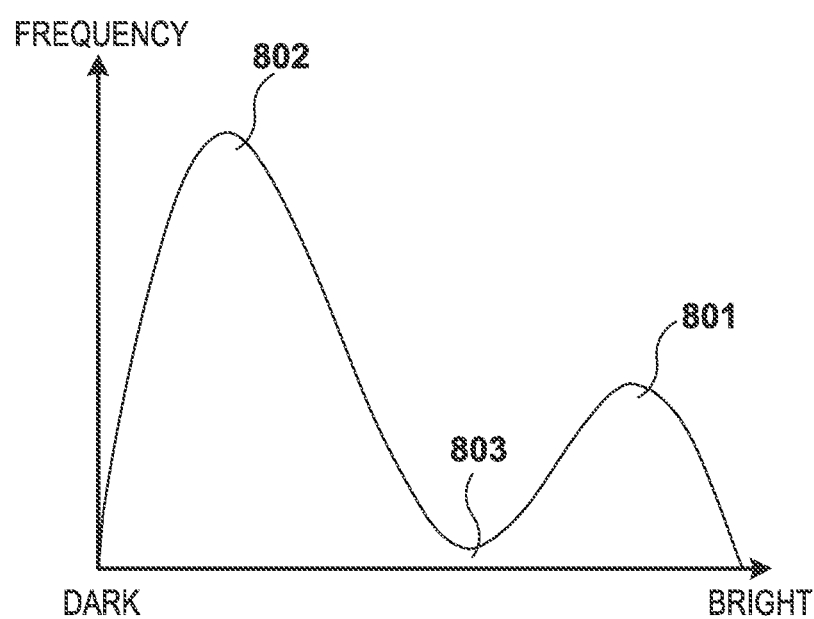
FIG. 8 shows an example of a histogram regarding the brightness of a captured scene.
Figure 10:
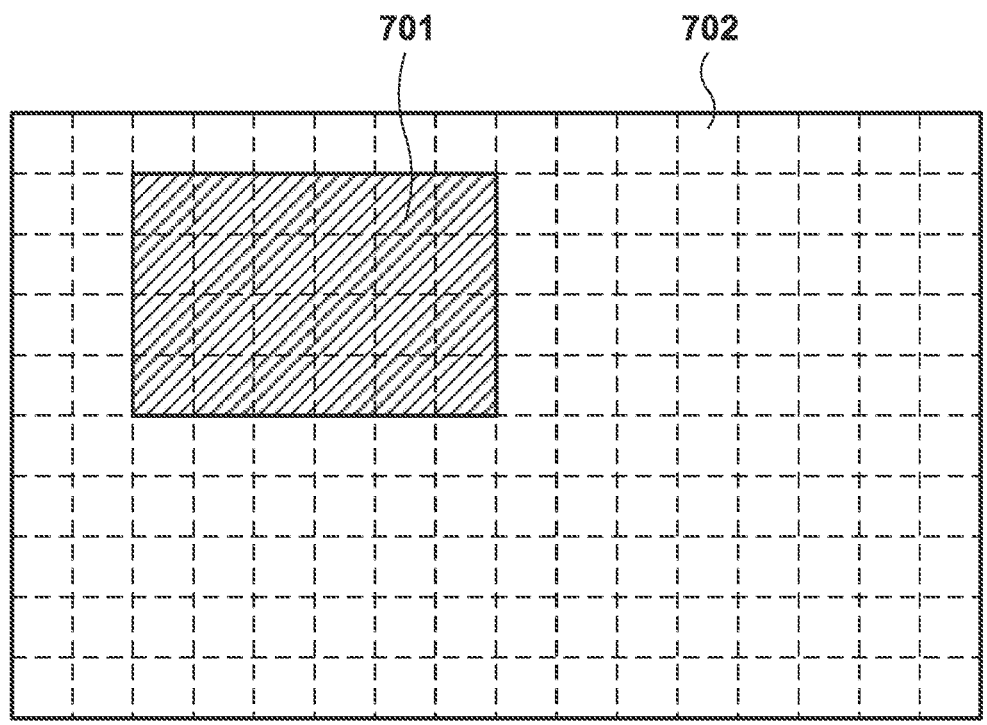
FIG. 10 illustrates mapping regarding a captured scene.

FIG. 7 shows an example of a scene in which an area that includes an area 701 outside the window and an indoor area 702 are captured. In this case, for example, the value of illuminance tends to be high in the area 701 and low in the area 702 during the day, and tends to be low in the area 701 and high in the area 702 at night. For example, FIG. 8 shows a histogram regarding the values of brightness of a captured image of such a scene in which there is a difference in illuminance. As shown in FIG. 8, this histogram may include, for example, a peak 802 corresponding to the indoor area 702 in which the value of brightness is relatively low during the day, and a peak 801 corresponding to the area 701 outside the window, in which the value of brightness is relatively high during the day. The histogram may also include a range 803 between the peak 801 and the peak 802, where the frequency is low. In this way, when the value of brightness of an area in a captured image is significantly different from the value of brightness of another area, e.g. when an indoor environment and an outdoor environment are captured at the same time, the frequency distribution of the value of brightness may be bipolarized as shown in FIG. 8. Using the result of histogram analysis, and using the map creation processing unit 422, the image processing unit 207 generates, for the captured scene, an image in which the area belonging to the peak 801 and the area belonging to the peak 802 are mapped. For example, the map creation processing unit 422 divides the entire image into a plurality of areas based on the histogram. In one example, an image to be processed, of a size of 1920×1080 pixels, is divided into 900 blocks of a size of 64×36 pixels, and the blocks are classified according to the value of brightness. For example, based on the histogram shown in FIG. 8, each block is determined as to whether the block belongs to a distribution range on the peak 801 side or a distribution range on the peak 802 side. For example, a predetermined value in the range 803 may be set as a threshold value, and the map creation processing unit 422 may classify the blocks into blocks in each of which the proportion of pixels with a brightness higher than the threshold value is no less than a predetermined proportion (e.g., the number of pixels is no less than ⅔ of the number of pixels in the block), and other blocks. An example of an image obtained as a result of such classification is shown in FIG. 10. In the example shown in FIG. 10, a portion corresponding to the outdoor area is bright, and, therefore, the blocks are classified such that this portion and the other portion can be distinguished from each other. The map creation processing unit 422 stores map information thus created (e.g., the image shown in FIG. 10 or information contained in a table, or the like, showing the result of the classification of the blocks) in the memory 440. Also, the camera server 110 transmits this map information to the viewer client 120.

The viewer client 120 receives this map information, and displays an image, specifying, for each area, one of the two peaks of the histogram to which the area belongs, as shown in FIG. 10. As a result, the image is displayed such that a user can select an area that is to be subjected to adjustment (step S602). In one example, the viewer client 120 may display the image such that an area of a smaller size, of the two classified areas, can be discerned. Note that the camera server 110 may notify the viewer client 120 of information regarding such an area of a smaller size as map information, and may not notify the viewer client 120 of information regarding an area of a larger size (an area that is not to be subjected to adjustment) as map information. In this example, an image is displayed so as to specify, for each area, one of two peaks of the histogram, as shown in FIG. 8, to which the area belongs. However, if three or more peaks are generated in the histogram, an image may be displayed such that the areas respectively corresponding to the peaks are distinguishable. Also, in this case, a predetermined number of areas, in ascending order of size, of a plurality of classified areas may be displayed so as to be distinguishable, and the other area(s) may not be displayed in a particular manner. Thereafter, the viewer client 120 accepts a user operation that designates an area that is to be subjected to adjustment (step S603). The viewer client 120 transmits information that specifies the area designated by the user operation, to the camera server 110.

The camera server 110 selects an image of an exposure corresponding to the area designated as an area that is to be subjected to adjustment, from among the plurality of images that are different from each other in exposure period, obtained in step S501 (step S504). For example, if the area 701 corresponding to the peak 801 shown in FIG. 8 is selected as an area that is to be subjected to adjustment, that is to say, if an area of an illuminance higher than that of the other area is selected as an area that is to be subjected to adjustment, the camera server 110 selects an appropriate image of a shorter exposure time for the shooting of the area. On the other hand, if an area of an illuminance lower than that of the other area is selected as an area that is to be subjected to adjustment, the camera server 110 selects an image of a longer exposure time.

Figure 12A:
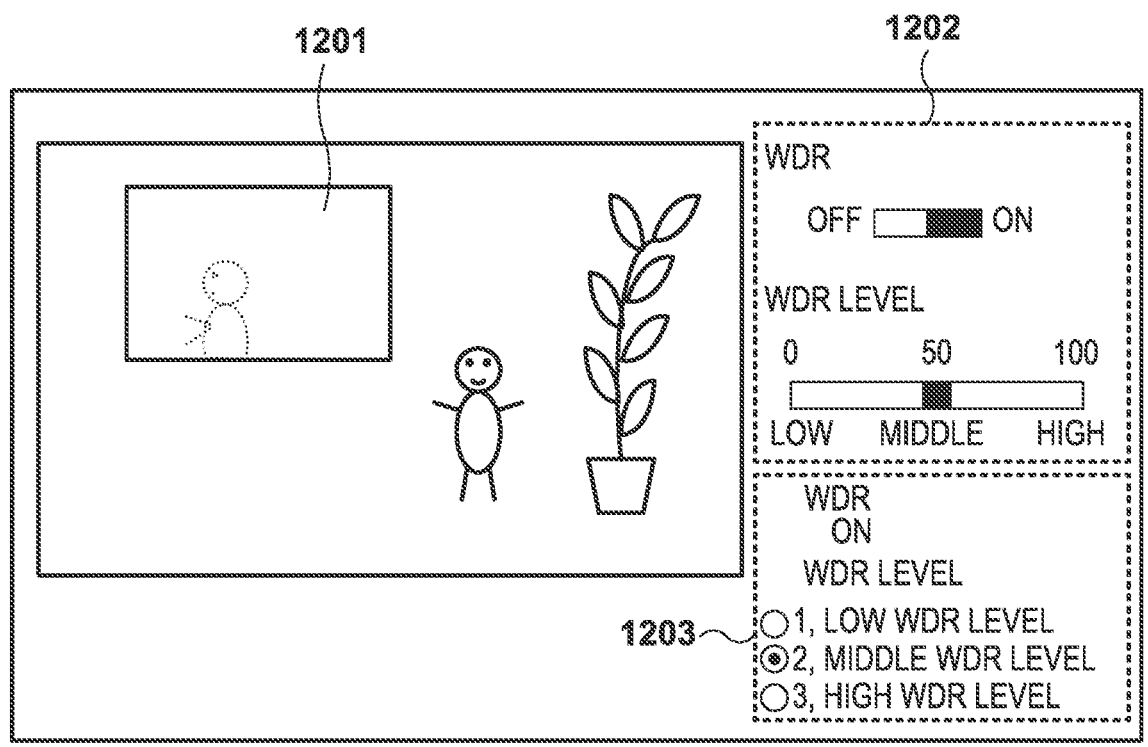
FIG. 12A shows an example of a user operation screen.

Subsequently, the viewer client 120 accepts designation of an adjustment level (step S604) and notifies the camera server 110 of information regarding the designated adjustment level. Note that, if the viewer client 120 has not accepted designation of an adjustment level, the viewer client 120 may not notify the camera server 110 of such information, or may notify the camera server 110 of information indicating that designation of an adjustment level has not been accepted. Note that, after an adjustment level has been automatically selected, if the result of selection is cancelled through a user operation, the camera server 110 may be notified of information indicating that designation has not been accepted. Such a notification may be transmitted as a command for operating the camera server 110. Designation of an adjustment level may be performed by accepting a user operation or accepting automatic designation made by a predetermined application, or the like. FIG. 12A shows an example of a graphical user interface for accepting designation of an adjustment level. In the example shown in FIG. 12A, an item that allows a user to select whether to turn ON or OFF WDR (Wide Dynamic Range) adjustment processing, which is performed to widen a dynamic range, and an item that allows a user to select the level (WDR level) of adjustment processing are displayed. Note that a user may be allowed to set the WDR level using a slide bar as shown in an area 1202, or to select the WDR level from among several level settings as shown in an area 1203. Although FIG. 12A shows a case where both the area 1202 and the area 1203 are displayed, only one of them may be displayed. Also, another method may be used. For example, a configuration that allows a user to input a numerical value indicating a WDR level may be employed. In the present embodiment, WDR is turned ON, and accordingly processing that will be described later is executed. A WDR level indicates an extent to which the output range of the area that is to be subjected to adjustment is widened. The higher the WDR level is, the more the output range of the area that is to be subjected to adjustment is extended.

Figure 11:
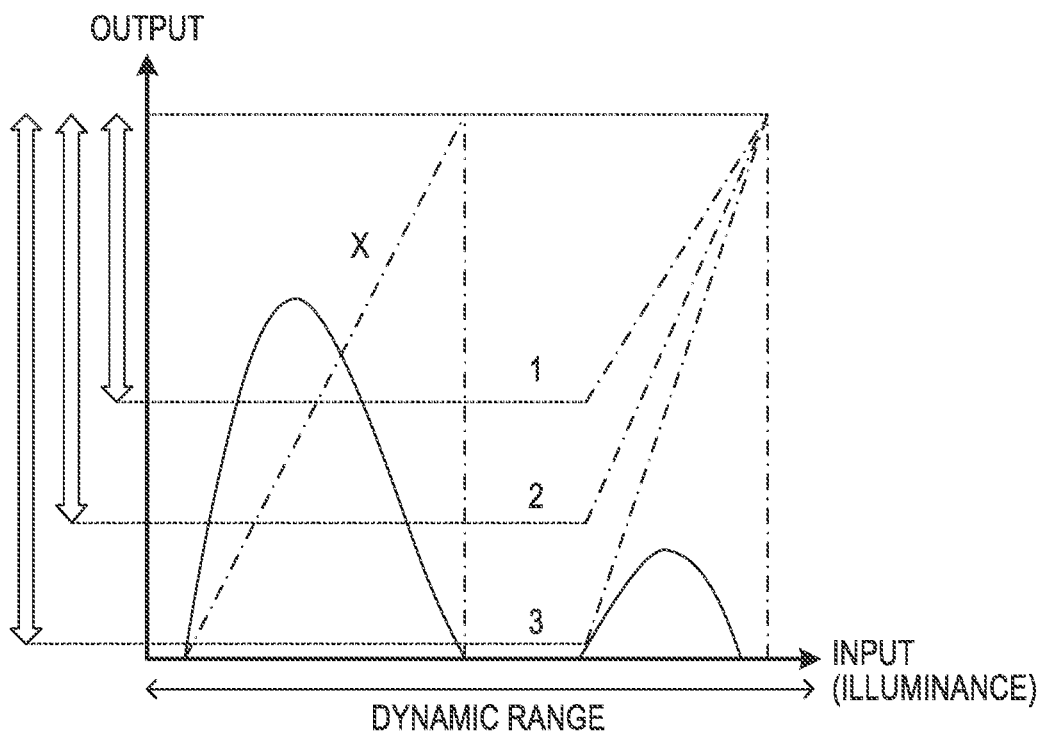
FIG. 11 illustrates a relationship between an input range and an output range for each setting.

The following describes a relationship between an input and an output when WDR processing according to the present embodiment is to be executed, with reference to FIG. 11. FIG. 11 shows a relationship between an input brightness value and an output brightness value of a pixel. In WDR processing according to the present embodiment, the relationship between the input and the output regarding the area 702, which is not selected, is determined through a normal procedure. That is to say, in this example of processing, for a pixel with a low brightness value (a pixel corresponding to a dark place), an output corresponding to an input is determined as indicated by a straight line 'X', as in the case when conventional WDR processing is applied. On the other hand, for the area 701 selected as an area that is to be processed, the output range is widened. That is to say, as shown in '1' to '3' of FIG. 11, regarding a predetermined range of brightness values that includes the pixel values of many pixels in the image area that is to be processed, the output range is widened when a pixel with a brightness value in the predetermined range is input. That is to say, the brightness value of an output pixel is lowered for a pixel with a low brightness value in the predetermined range. On the other hand, when a pixel with a high brightness value in the predetermined range is input, a pixel with a brightness value that is similar to a brightness value in the case where conventional WDR processing is applied is output. At this time, if the WDR level is high, the output brightness value is set to be lower for a pixel with a relatively low brightness value. That is to say, when the WDR level is high, an output such as that shown in '3' of FIG. 11 is used, and when the WDR level is low, an output such as that shown in '1' of FIG. 11 is used. Although FIG. 11 shows an example in which three WDR levels are provided, two WDR levels or four or more WDR levels may be provided.

The above-described predetermined range of the input brightness values is determined through the histogram analysis performed in step S503. For example, in the present embodiment, as shown in FIG. 8, the range 803 sandwiched between the two distribution peaks (the peak 801 and the peak 802) is set as a boundary, and if the area 701 is selected, a range including values on the peak 801 side is determined as the predetermined range. Note that, if the area 702 is selected, a range including values on the peak 802 side may be determined as the predetermined range. In this case, for example, output brightness values for an area with high input brightness values in the predetermined range may be increased to be higher than those in the case when conventional WDR processing is executed.

Note that the level of WDR processing may be automatically determined. For example, regarding an indoor back-lit scene with a window as shown in FIG. 7, an area that is to be processed, determined as a result of the histogram analysis performed in step S503, is an area with brightness values corresponding to the peak 801 shown in FIG. 8. The peak 801 corresponds to a predetermined range of the distribution of higher brightness values (including an input range 1301) in FIG. 13. Next, specific ranges in the predetermined range, such as the upper 5% range and the lower 5% range are respectively set as a highlight point and a dark point, and the input range 1301 is calculated. Based on the input range 1301 thus calculated, an output range 1303 is determined with reference to a predetermined correspondence table showing the correspondence between the input range and the output range, such as a correspondence table 1302. For example, if the width of the input range is less than 32, the width of the output range is determined to be 64. Thereafter, an output value 1304 is calculated such that the highlight point is the maximum output value and the dark point is the minimum value in the output range determined as described above. As a result, when input values are distributed in a narrow range, brightness values are not excessively increased, whereas the output range is widened. Therefore, it is possible to realize appropriate luminosity and color reproduction. Note that a table such as the correspondence table 1302 shown in FIG. 13 may also be prepared for a case when the WDR level is designated by a user. That is to say, separate tables may be prepared respectively for cases when the WDR level is "high", "middle", and "low". For example, tables may be prepared such that, in a case when the width of the input range is less than thirty-two, if the WDR level is "low", the width of the output range is set to be forty-eight, if the WDR level is "middle", the width of the output range is set to be sixty-four, and if the WDR level is "high", the width of the output range is set to be ninety-six. In this regard, the output range is determined according to whether or not the area that is to be processed has a distribution of brightness values that are higher than those in the area that is not to be processed (e.g., according to whether the area that is to be processed corresponds to the peak 801 or the peak 802). That is to say, if the area corresponding to the peak 801 with a high brightness value is to be processed, the output range may be determined such that the narrower the input range is, the brighter a dark part of the area is. If the area corresponding to the peak 802 with a low brightness value is to be processed, the output range may be determined such that the narrower the input range is, the darker a dark part in the area is.

Figure 13:
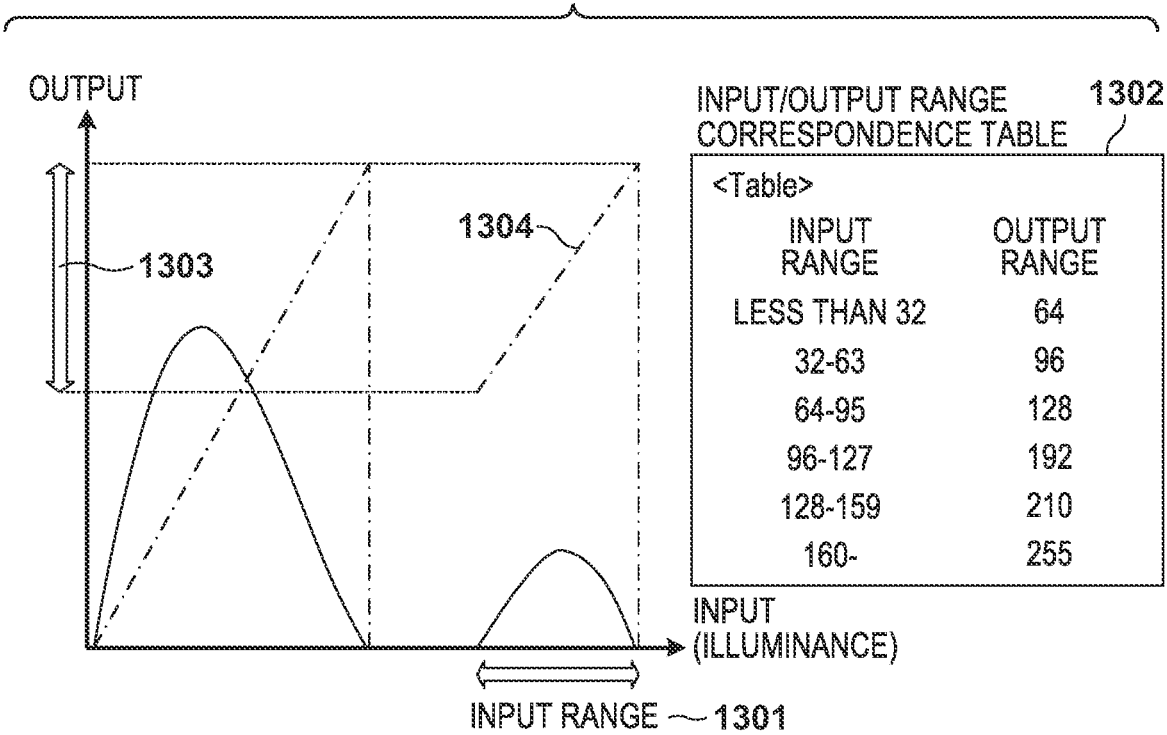
FIG. 13 illustrates a relationship between an input range and an output range in the case of automatic setting.

The camera server 110 determines whether or not the area that is to be subjected to adjustment and the adjustment level have been designated on the viewer client 120 (step S505), and if there is such designation (YES in step S505), the camera server 110 proceeds to perform the processing in step S506. On the other hand, if there is no such designation (NO in step S505), the camera server 110 proceeds to perform the processing in step S507. In step S506, the camera server 110 executes processing to select an input range and an output range according to a notification from the viewer client 120 regarding the result of selection. In step S506, an input range corresponding to the designated area that is to be subjected to adjustment may be selected according to the result of histogram analysis in step S503. Also, if a WDR level has been designated by the user, an output range may be determined according to one of '1' to '3' of FIG. 11, depending on which WDR level has been designated from among "high", "middle", and "low" levels, for example. If the WDR level is to be automatically set, an output range corresponding to the input range may be determined as shown in FIG. 13. In step S507, the relationship between the input and the output indicated by the straight line 'X' in FIG. 11 may be used for the entire image, without performing WDR processing according to the present embodiment.

Figure 15:
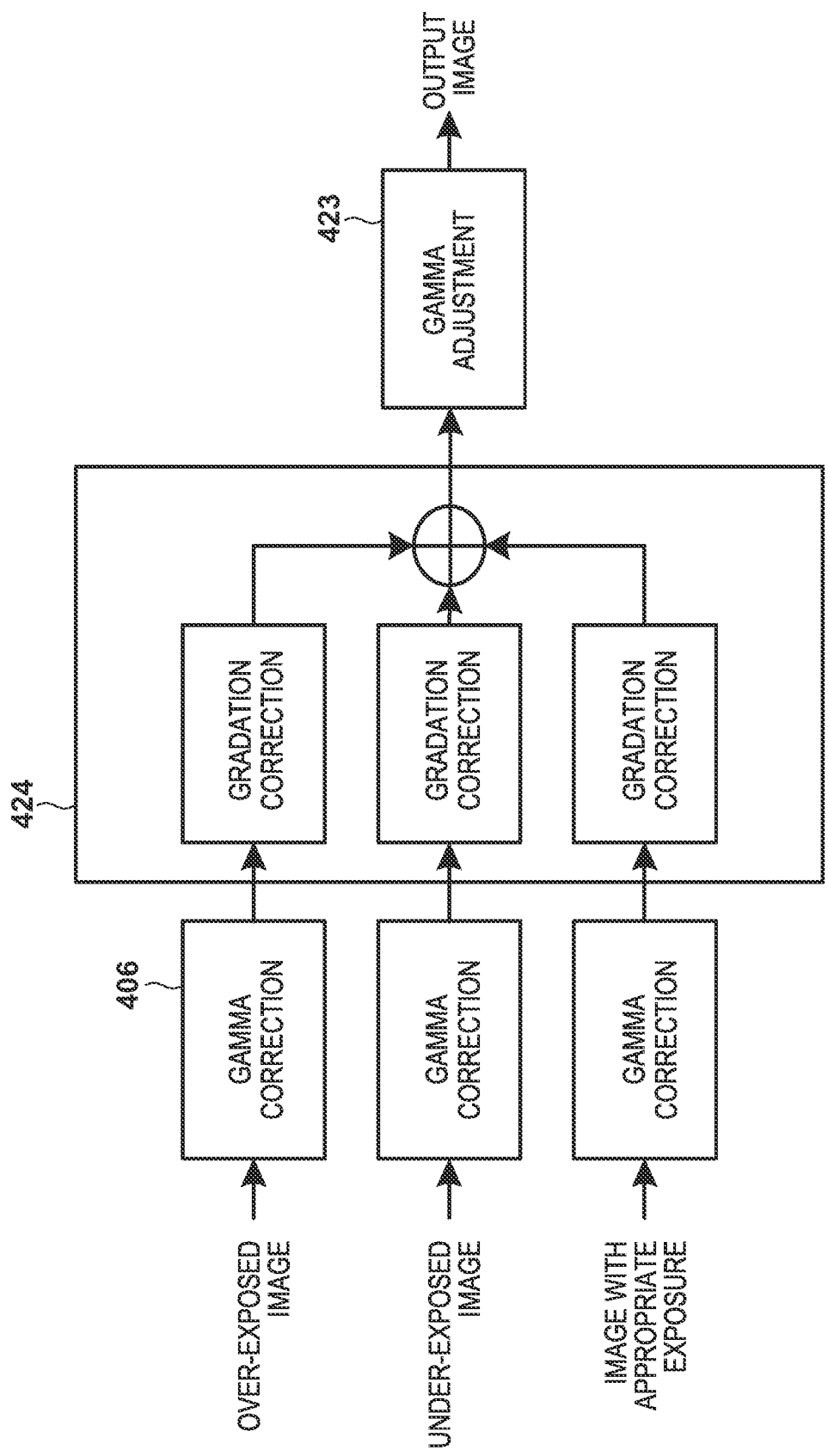
FIG. 15 illustrates combining processing for a plurality of images that have been shot at different exposures.
Figure 16A:
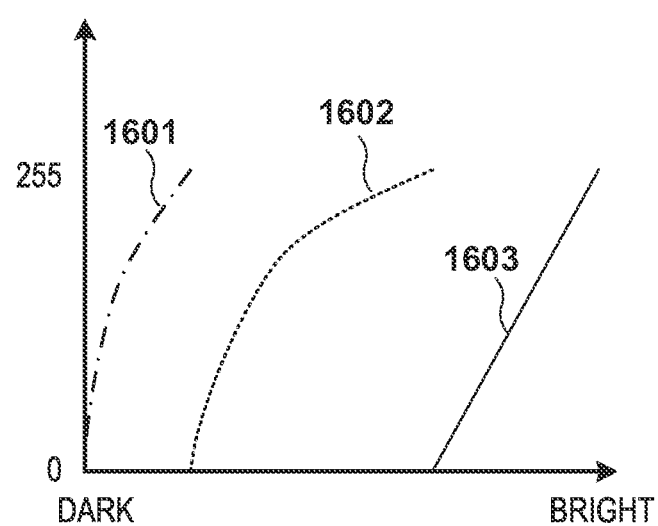
FIGS. 16A to 16C illustrate gamma values and combining processing that are applied to a plurality of images that have been shot at different exposures.
Figure 16B:
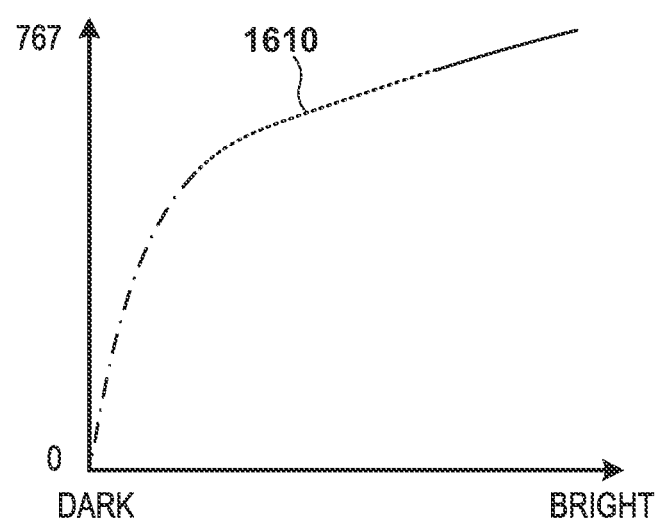
Figure 16C:
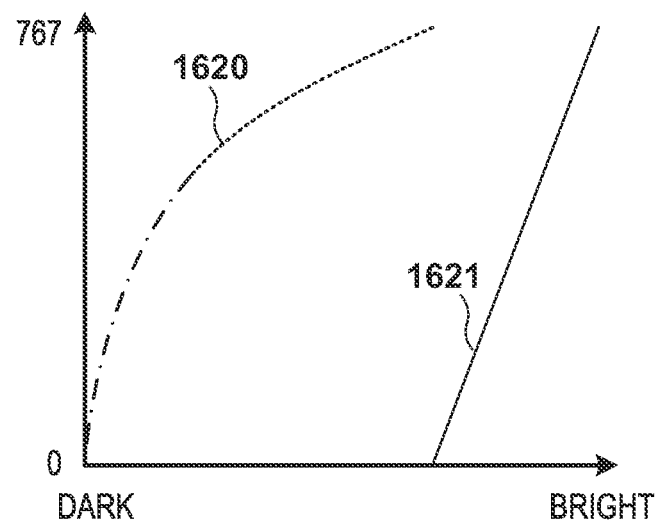

Thereafter, the camera server 110 performs gamma adjustment processing (step S508), and combines a plurality of images of different exposures that have been subjected to gamma adjustment (step S509). The following describes combining processing with reference to FIGS. 15 and 16A to 16C. FIG. 15 is a block diagram illustrating combining processing. First, gamma correction is performed by the gamma correction unit 406 on a plurality of images that have been respectively shot at exposures that are different from each other (e.g., an under-exposed image, an image with appropriate exposure, and an over-exposed image), and the images that have been subjected to correction are temporarily stored in the memory 440. Note that an under-exposed image is suitable for shooting in a bright place because its exposure period is short, and an over-exposed image is suitable for shooting in a dark place because its exposure period is long. Also, the appropriate exposure mentioned above is an appropriate exposure for the indoor area 702, which occupies a large area in the image. The low exposure is an appropriate exposure for the area 701 outside the window. In the WDR combining processing unit 424, the stored images are subjected to gradation correction, which includes the addition of an offset of a predetermined value or gradation extension processing. Note that the image specified in step S504 is not subjected to offset addition processing, but is only subjected to gradation extension processing. Offset addition processing is performed only on an unselected image. Thereafter, the images are added and combined. The above-described gamma adjustment unit 423 performs gamma adjustment on the combined image, and this image is output as an output image. FIGS. 16A to 16C illustrate gamma values and combination processing that are applied to images. FIG. 16A shows gamma curves that are applied to three types of images of different exposures. Each gamma curve shows a relationship between an input and an output. FIG. 16A shows a gamma curve for an over-exposed image (a relationship 1601), a relationship 1602 for an appropriate exposure image, and a relationship 1603 for an under-exposed image. Note that the input indicated by the horizontal axis is a value for which a difference in exposure between the images is taken into consideration. The vertical axis indicates an output value of eight bits (0 to 255). Note that the relationship between the input and the output when no image has been designated in the above-described step S504 is indicated by a curve 1610 shown in FIG. 16B. The gamma curve for the appropriate exposure is offset by 256 and added to the gamma curve shown in FIG. 16A through offset addition, and the gamma curve for the low exposure is offset by 512 and added to the same through offset addition. Thus, the curve 1610 is obtained. According to the characteristics of this curve, the output brightness of the under-exposed image that is to be output is in the range of 512 to 767. With the reproduction gamut of the combined image shown in FIG. 16B, the output gradation is kept continuous with the input gradation, while visibility decreases, especially on a display apparatus with a narrow dynamic range. FIG. 16C shows the relationship between the input and the output when the under-exposed image has been designated in step S504. In this case, the gamma curve for the appropriate exposure is offset by 256 and added to the gamma curve shown in FIG. 16A through offset addition, and, thus, a portion of a relationship 1620 is obtained. On the other hand, the under-exposed image, which is the selected image, is not subjected to offset addition, but is subjected to gamma value extension processing, and, thus, characteristics indicated by a relationship 1621 are obtained. As a result, the output range (the gamma values) of the under-exposed image is set so as to overlap at least a portion of the output range (the gamma values) of the appropriate exposure image and the over-exposed image. Through such processing, a dark part of the under-exposed image becomes dark, and it is possible to ensure visibility by employing the gamma characteristics selected by the user, even in the case of a display apparatus with a narrow dynamic range. Note that, according to this example of processing, an area of high input brightness is to be processed, and, therefore, a dark part of the area is processed so as to be dark. However, if an area of low input brightness is to be processed, processing is performed such that a bright part of the area becomes even brighter. Note that the output range can be set as described above, and when an area of high input brightness is to be processed, the narrower the output range is, the brighter a dark part of the area is, whereas, when an area of low input brightness is to be processed, the narrower the output range is, the darker a bright part of the area is.

Figure 9A:
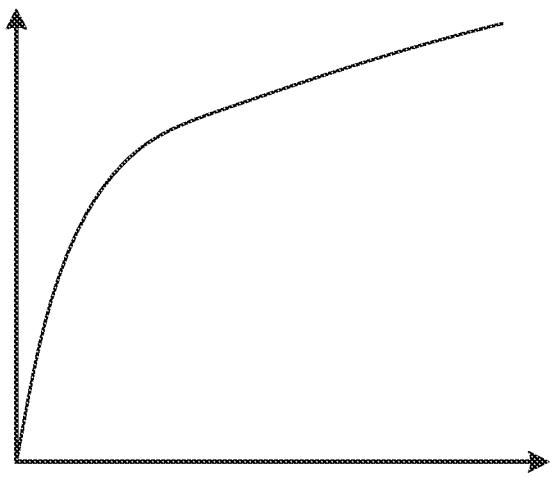
FIGS. 9A to 9D conceptually illustrate gamma curves.
Figure 9B:
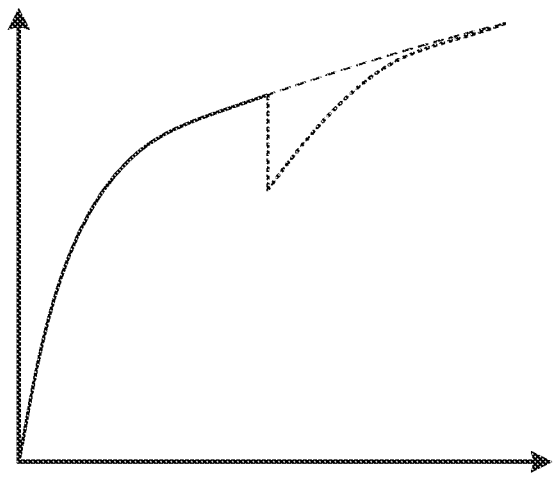
Figure 9C:
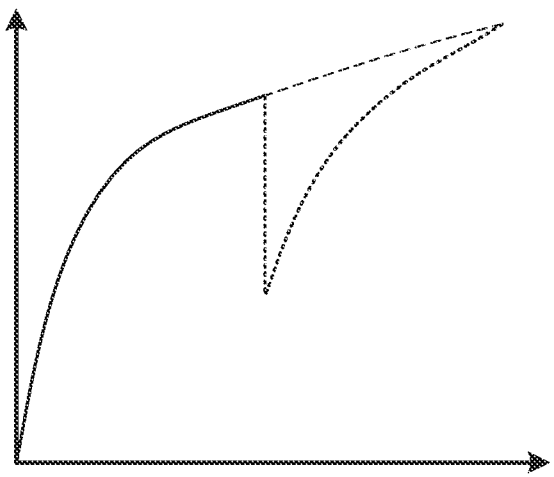
Figure 9D:
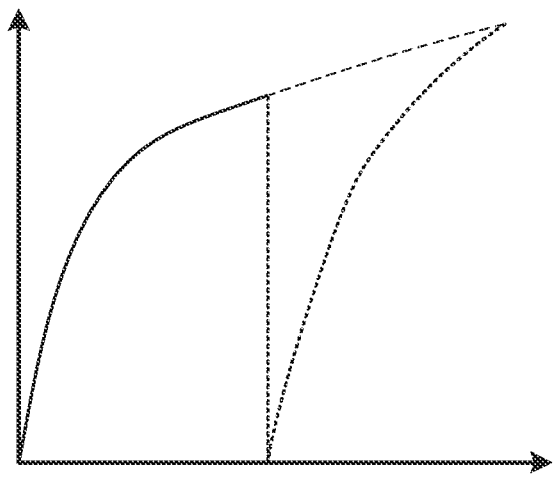
Figure 12B:
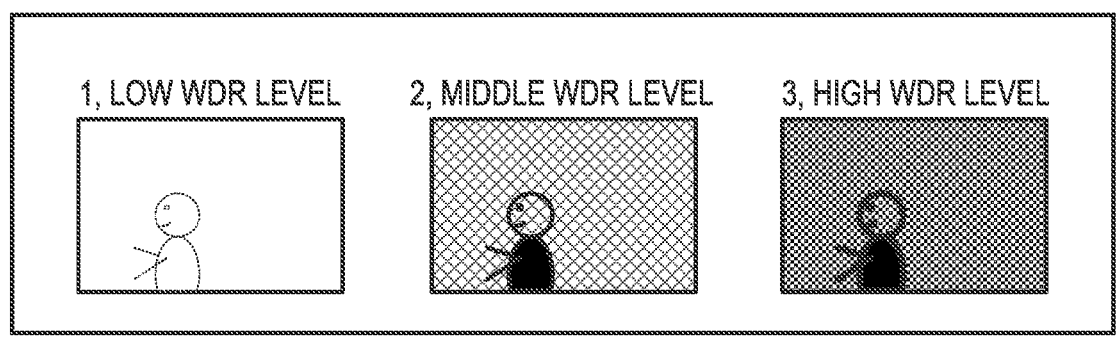
FIG. 12B shows an example of an image that has been subjected to wide dynamic range (WDR) processing.

The following describes a concept regarding the relationship between input and output of an image resulting from combination performed after processing according to the present embodiment, with reference to FIGS. 9A to 9D. FIG. 9A shows a relationship between the input and the output in a case when conventional WDR processing is executed. FIGS. 9B to 9D show relationships between the input and the output in cases when '1' to '3' of FIG. 11 are used, respectively. As shown in FIGS. 9B to 9D, as a result of processing according to the present embodiment, the output brightness of pixels with relatively low brightness values is lowered regarding an input range for a part corresponding to the area 701, for example, and, thus, the output range appears to be widened. Note that, even if the area 702 includes a pixel with a high brightness value, the output range of the pixel is not widened. This is because output range widening processing, which is performed on pixels in the area 702, is not performed on pixels in the area 701. When the WDR level is low, the relationship between the input and the output after gamma correction has been performed is that shown in FIG. 9B, and when the WDR level is high, the relationship between the input and the output after gamma correction has been performed is that shown in FIG. 9D. When the WDR level is at a midpoint between them, the relationship between the input and the output after gamma correction has been performed is that shown in FIG. 9C. FIG. 12B shows examples of outputs after WDR processing has been performed on an area 1201 using these WDR levels. If WDR processing is executed, the output brightness of pixels with low brightness values is lowered even if the WDR level is "low". Therefore, a subject included in the area 1201, such as a person, becomes more distinct. If the WDR level is increased to "middle", the output brightness of pixels with low brightness values is further lowered, and the range of the output brightness is widened. Thus, the subject becomes even more distinct. On the other hand, the brightness of the image is lowered overall, and, therefore, the area that is to be processed becomes relatively darker overall. Similarly, if the WDR level is increased to "high", the output brightness of pixels with low brightness values is further lowered, the subject becomes even more distinct, and the brightness of the area is lowered overall, and the area becomes darker overall.

The camera server 110 transmits the combined image obtained in step S509 to the viewer client 120. The viewer client 120 displays the received image (step S605). Through the above-mentioned combining processing, a plurality of images of different exposures are classified according to a predetermined degree of exposure, the gradations of the appropriate exposure image and the over-exposed image are added to each other for a dark area, and the gradations of the appropriate exposure image and the under-exposed image are added to each other for a bright area, as described above. However, there is no limitation to this, and, for example, the visibility of a subject may be improved by using, for the area to be processed, an image captured at an exposure that is suitable for the area, and using, for the other area, an image captured at an exposure that is suitable for the other area. Note that the camera server 110 executes combining processing shown in FIG. 16C on the area 701 and executes combining processing shown in FIG. 16B on the area 702. Furthermore, settings for image processing other than gamma adjustment, such as white balance adjustment, noise reduction processing, sharpness processing, contrast adjustment, and saturation adjustment, can also be changed for each of a plurality of images of different exposures. Note that the image displayed in step S605 may be an image of only the selected area that is to be processed, as shown in FIG. 12B, or an image generated by further combining images respectively prepared for the area 701 and the area 702 (e.g., by embedding).

Although the above-described embodiment describes an example in which an area with higher brightness values compared to the other area is selected as an area that is to be processed, the present invention is not limited to this example. That is to say, an area with lower brightness values compared to the other area may be selected as an area that is to be processed.

As described above, the viewer client 120 displays moving images distributed by the camera server 110, and can also determine settings of the camera server 110 regarding shooting and a network. In step S602, the viewer client 120 may display shot images distributed by the camera server 110 and the above-described map, one superimposed on the other, on a display screen of the display unit 307 (a monitor, a display, or the like, used by the user), for example. At this time, the viewer client 120 may display a frame, fill areas with different colors, or display blinking areas, such that different areas on the map can be distinguished from each other. Also, the viewer client 120 may display a frame, display color, or display a blinking area upon the user clicking on, and selecting, an area in the image. Although the present embodiment describes a case when an area that is to be processed (a selected area) is a rectangular area, such an area may have any shape.

Note that settings received from the viewer client 120 may affect image processing parameters for image processing modules, which are changed according to a threshold value set by the attribute generation unit 409. For example, the attribute generation unit 409 sets a brightness threshold value corresponding to the range 803 where the frequency in the histogram is low, and image processing parameters are changed with reference to this value, which serves as a boundary. Therefore, even if a subject moves, the same gamma correction is continuously applied to the same subject. Similarly, the white balance for high brightness pixels may also be kept the same.

As described above, according to this example of processing, even if the relationship in terms of brightness is discontinuous and the relationship between input and output is reversed, a bright area or a dark area is made visible. Therefore, it is possible to display an image that is suitable for a monitoring system, or the like. Also, a mode in which normal continuous gamma adjustment is performed and a monitoring mode in which processing according to the present embodiment may be provided, and the system may be configured to allow for mode selection such that WDR processing according to the present embodiment is performed when the monitoring mode is selected. Thus, by allowing a user to select a mode in which visibility is considered important, versatility can be improved. Furthermore, even if there is a change in illuminance, it is possible to maintain appropriate luminosity and color reproduction despite the change, by automatically making optimum settings.

In this example of processing, an output brightness range corresponding to an input brightness range is selected through a user operation or automatically selected for an image with a predetermined brightness value, of a plurality of images of different exposures. Thus, it is possible to realize appropriate luminosity and color reproduction while widening the dynamic range.

Second Example of Processing

In the above-described first example of processing, an area of an image resulting from classification based on a histogram is selected, and an output range for the area is widened. In this example of processing, the output range of the image is adjusted using a plurality of images of different exposures. The following provides a description particularly focusing on points that differ from the first example.

In this example of processing, the viewer client 120 selects an image that is to be processed, in step S603. The image that is to be processed mentioned here is an image from among a plurality of images of different exposures that have not been combined. An image that is to be subjected to adjustment is selected from among images shot at three different exposures, namely, an under-exposed image, an appropriate exposure image, and an over-exposed image.

Figure 14:
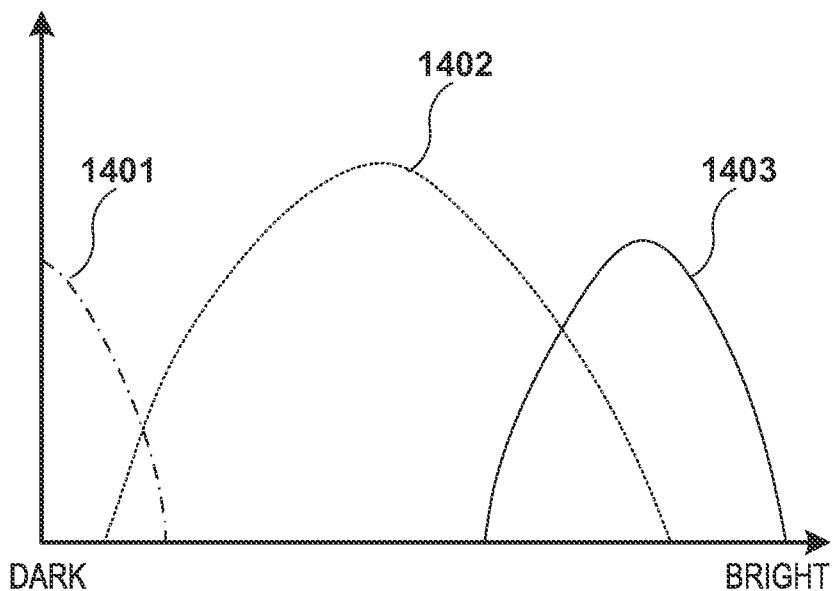
FIG. 14 shows examples of histograms regarding the brightness of images that have been respectively shot at exposures that are different from each other.

In this example of processing, histogram analysis is performed in step S503 on each of a plurality of images shot at exposures that are different from each other (e.g., an under-exposed image, an appropriate exposure image, and an over-exposed image). FIG. 14 shows an example of a histogram for the brightness of each image of the scene shown in FIG. 7. A curve 1401, a curve 1402, and a curve 1403 respectively show histograms for the under-exposed image, the appropriate exposure image, and the over-exposed image. The appropriate exposure is appropriate for the indoor area 702 that occupies a large area in the image, and the low exposure is appropriate for the area 701 outside the window. In step S503, a histogram as shown in FIG. 8 is created for each of a plurality of images shot at exposures that are different from each other. Next, in step S504, the camera server 110 obtains the image to be processed, which has been designated by the viewer client 120 in step S603. If an image that is to be processed has not been designated in step S602, the processing in steps S506 and S508 is not performed because there is no image to be processed. Thus, an image that is to be subjected to adjustment processing is selected from among a plurality of images shot at different exposures. In step S508, gamma adjustment using gamma characteristics selected in step S604 is performed on the image selected in step S603. Unselected images are subjected to default gamma conversion. Thereafter, the images are combined. Image combining is as described above with reference to FIGS. 15 and 16A to 16C.

Although the entire shot area is subjected to combining processing in this example of processing, the present invention is not limited to this example. That is to say, as with the first example of processing, at least portions of the shot images may be subjected to combining processing. Also, a plurality of images of different exposures are classified according to a predetermined degree of exposure, the gradations of the appropriate exposure image and the over-exposed image are added to each other for a dark area, and the gradations of the appropriate exposure image and the under-exposed image are added to each other for a bright area. Furthermore, settings for image processing other than gamma adjustment, such as white balance adjustment, noise reduction processing, sharpness processing, contrast adjustment, and saturation adjustment, may also be changed for each of a plurality of images of different exposures.

According to this example of processing, an output brightness range corresponding to an input brightness range is selected through a user operation for an image of a predetermined brightness from among a plurality of images of different exposures. Therefore, it is possible to realize appropriate luminosity and color reproduction while widening the dynamic range.

Third Example of Processing

The second example of processing describes a case when a user selects the WDR level from among a plurality of candidates. This example of processing describes a case when an appropriate WDR level is automatically applied when no WDR level has been selected through a user operation.

According to this example of processing, regarding an indoor back-lit scene with a window as shown in FIG. 7, an image with brightness values corresponding to the peak 801 shown in FIG. 8 is selected as an image that is to be subjected to gamma adjustment in step S508, as a result of the histogram analysis performed in step S503. Next, as with the first example of processing, for example, the upper 5% range and the lower 5% range of a predetermined range corresponding to the peak 801 in the distribution shown in FIG. 13 are respectively set as a highlight point and a dark point, and the input range 1301 is calculated. Based on the input range 1301 thus calculated, the output range 1303 is determined with reference to a predetermined correspondence table showing the correspondence between the input range and the output range, such as the correspondence table 1302. Furthermore, the output value 1304 is calculated such that the highlight point is the maximum output value and the dark point is the minimum value in the output range determined as described above.

Thus, even if the distribution of input brightness values is narrow, it is possible to realize appropriate luminosity and color reproduction by widening the dynamic range, without excessively increasing the brightness values. This example of processing describes a case when a high brightness area in an indoor back-lit scene with a window as shown in FIG. 7 is determined as an area that is to be processed. However, conversely, a low brightness area may be determined as an area that is to be processed.

According to this example of processing, even if the relationship in terms of brightness is discontinuous and the relationship between input and output is reversed, a bright area or a dark area is made visible. Therefore, it is possible to display an image that is suitable for a monitoring system, or the like. Also, a mode in which normal continuous gamma adjustment is performed and a monitoring mode in which processing according to the present embodiment may be provided, and the system may be configured to allow for mode selection such that WDR processing according to the present embodiment is performed when the monitoring mode is selected. Thus, by allowing a user to select a mode in which visibility is considered important, versatility can be improved. Furthermore, even if there is a change in illuminance, it is possible to maintain appropriate luminosity and color reproduction in response to the change, by automatically making optimum settings.

In this example of processing, an output brightness range corresponding to an input brightness range is automatically selected for an image with a predetermined brightness value, of a plurality of images of different exposures. Thus, it is possible to realize appropriate luminosity and color reproduction while widening the dynamic range.

In the first and second examples of processing, the viewer client 120 notifies the camera server 110 of the designation of an image and a WDR level through a user operation, using a command. A combined image that reflects the content of the command is distributed from the camera server 110 to the viewer client 120, and displayed on the viewer client 120. However, the present invention is not limited in this way. For example, uncombined images may be distributed from the camera server 110 to the viewer client 120, and the images may be combined in the viewer client 120. If this is the case, there is no need to transmit the command, and it is possible to check the output corresponding to the result of user selection in a short period of time. Although the above-description mainly illustrates a configuration in which the camera server 110 functions as an image processing apparatus that includes the image processing unit 207, and the viewer client 120 functions as an information display apparatus that displays a processed image, the present invention is not limited to such a configuration. That is to say, the viewer client 120 may include the image processing unit 207 and obtain unprocessed image data from the camera server 110, and the viewer client 120 may execute the above-described processing illustrated as processing that is to be executed by the camera server 110.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) one or more processors; and
   (B) at least one memory that stores a computer program for causing, when executed by the one or more processors, the one or more processors to function as:
      (a) a classification unit configured to classify areas included in an image in which one scene is captured, based on the distribution of brightness values of the image;

(b) an accepting unit configured to accept selection of an area that is to be processed, from among the classified areas;

(c) an extension unit configured to extend a first output range corresponding to an input range of brightness values of pixels in the selected area, so as to be wider than a second output range that is the output range when the area is not selected; and (d) an output unit configured to output an image for which an output range of brightness values has been extended to the first output range and that includes at least the selected area, wherein the extension unit extends a third output range corresponding to an input range of brightness values of an image corresponding to the selected area, among a plurality of images obtained by capturing the one scene at exposures that are different from each other, so as to be wider than a fourth output range that is the output range when the area is not selected, and wherein the output unit combines, regarding the selected area, an image for which an output range has been extended to the third output range, of the plurality of images, and an image for which an output range has not been extended to the third output range, of the plurality of images, and outputs the combined image.

2. The image processing apparatus according to claim 1, wherein the output unit combines, regarding the unselected area, a plurality of images for which an output range has not been extended to the third output range, and outputs the combined image.

3. The image processing apparatus according to claim 1, wherein the first output range overlaps at least a portion of an output range of brightness of the unselected area.

4. The image processing apparatus according to claim 1, wherein the extension unit sets the input range of brightness values based on the distribution of brightness values corresponding to the selected area, and determines the width of the first output range based on the width of the input range.

5. The image processing apparatus according to claim 1, wherein the accepting unit accepts a user operation that is made to determine the width of the first output range.

6. The image processing apparatus according to claim 4, wherein, in a case when the selected area has a distribution of brightness values that are higher than a distribution of brightness values in the unselected area, the extension unit determines the width of the first output range such that the narrower the input range is, the brighter a dark part of the selected area is.

7. The image processing apparatus according to claim 4, wherein, in a case when the selected area has a distribution of brightness values that are lower than a distribution of brightness values in the unselected area, the extension unit determines the first output range such that the narrower the input range is, the darker a bright part of the selected area is.

8. The image processing apparatus according to claim 1, wherein the computer program causes, when executed by the one or more processors, the one or more processors to further function as:

(e) an execution unit configured to execute image processing using a different parameter for each classified area.

9. A method of controlling an image processing apparatus, the method comprising:

classifying areas included in an image in which one scene is captured, based on the distribution of brightness values of the image;

accepting selection of an area that is to be processed, from among the classified areas;

extending a first output range corresponding to an input range of brightness values of pixels in the selected area, so as to be wider than a second output range that is the output range when the area is not selected; and outputting an image for which an output range of brightness values has been extended and that includes at least the selected area, wherein, in the extending, a third output range is extended so as to be wider than a fourth output range that is the output range when the area is not selected, the third output range corresponding to an input range of brightness values of an image corresponding to the selected area, among a plurality of images obtained by capturing the one scene at exposures that are different from each other, and wherein, in the outputting, regarding the selected area, an image for which an output range has been extended to the third output range, of the plurality of images, is combined with an image for which an output range has not been extended to the third output range, of the plurality of images, and the combined image is output.

10. A non-transitory computer-readable storage medium that stores a program for causing a computer included in an image processing apparatus:

to classify areas included in an image in which one scene is captured, based on the distribution of brightness values of the image;

to accept selection of an area that is to be processed, from among the classified areas;

to perform extension of a first output range corresponding to an input range of brightness values of pixels in the selected area, so as to be wider than a second output range that is the output range when the area is not selected; and to perform outputting of an image for which an output range of brightness values has been extended to the first output range and that includes at least the selected area, wherein, in the extension, a third output range is extended so as to be wider than a fourth output range that is the output range when the area is not selected, the third output range corresponding to an input range of brightness values of an image corresponding to the selected area, among a plurality of images obtained by capturing the one scene at exposures that are different from each other, and wherein, in the outputting, regarding the selected area, an image for which an output range has been extended to the third output range, of the plurality of images, is combined with an image for which an output range has not been extended to the third output range, of the plurality of images, and the combined image is output.

* * * * *